US008527230B2

(12) United States Patent
Ishiguro et al.

(10) Patent No.: US 8,527,230 B2

(45) Date of Patent: Sep. 3, 2013

(54) SENSOR CONTROL APPARATUS

(75) Inventors: Yasuhiro Ishiguro, Nagakute-cho (JP); Katsunori Yazawa, Kasugai (JP); Hiroshi Inagaki, Komaki (JP); Keiji Suzuki, Kitanagoya (JP); Tetsuma Shimozato, Nagoya (JP)

(73) Assignee: NGK Spark Plug Co., Ltd., Aichi (JP)

( * ) Notice: Subject to any disclaimer, the term of this patent is extended or adjusted under 35 U.S.C. 154(b) by 206 days.

(21) Appl. No.: 12/978,066

(22) Filed: Dec. 23, 2010

(65) Prior Publication Data

US 2011/0166816 A1 Jul. 7, 2011

(30) Foreign Application Priority Data

Dec. 25, 2009 (JP) ................................ 2009-294996

(51) Int. Cl.
*G01C 25/00* (2006.01)

(52) U.S. Cl.
USPC .......................................... 702/116; 702/104

(58) Field of Classification Search
USPC .......................... 702/104, 116; 123/672, 693
See application file for complete search history.

(56) References Cited

U.S. PATENT DOCUMENTS

| | | | | |
|---|---|---|---|---|
| 7,367,330 | B2 * | 5/2008 | Yoshidome | 123/672 |
| 2007/0023020 | A1 | 2/2007 | Yoshidome | |
| 2010/0241340 | A1 * | 9/2010 | Weber et al. | 701/109 |

FOREIGN PATENT DOCUMENTS

| | | | | |
|---|---|---|---|---|
| JP | 62-7063 | | | 1/1987 |
| JP | 2004150379 | A | * | 5/2004 |
| JP | 2007-032466 | A | | 2/2007 |

OTHER PUBLICATIONS

Douglas C Montgomery, Introduction to statistical quality control, 2005, John Wiley & Sons.*
Machine translation of JP 2004150379.*
Original JP 2004150379.*
Japanese Office Action mailed on Jun. 4, 2013 from the Japanese Patent Office in Japanese Application No. 2010-284102.

* cited by examiner

*Primary Examiner* — Sujoy Kundu
*Assistant Examiner* — Harun Chowdhury
(74) *Attorney, Agent, or Firm* — Sughrue Mion, PLLC

(57) ABSTRACT

An oxygen sensor control apparatus (10) obtains a correction coefficient for calibrating the relation between oxygen concentration and an output value of an oxygen sensor (20), when a fuel cut operation of an internal combustion engine (100) is performed. The apparatus includes average output value calculation means; inter-fuel-cut average output value calculation means; and correction coefficient calculation means.

5 Claims, 8 Drawing Sheets

SENSOR CONTROL APPARATUS

TECHNICAL FIELD

The present invention relates to an oxygen sensor control apparatus which calibrates the relation between oxygen concentration of exhaust gas discharged from an internal combustion engine and output of an oxygen sensor for detecting the oxygen concentration, and which detects the oxygen concentration of the exhaust gas.

BACKGROUND ART

Conventionally, an oxygen sensor has been disposed in an exhaust passage (exhaust pipe) of an internal combustion engine of an automobile or the like so as to detect the oxygen concentration of exhaust gas, on the basis of which the air-fuel ratio is controlled. An example of such an oxygen sensor is one which includes a gas detection element having at least one cell in which a pair of electrodes are formed on oxygen-ion conductive zirconia. However, there has been a problem in that accuracy in detecting oxygen concentration varies among individual oxygen sensors because of variation in output characteristic among the individual oxygen sensors and deterioration of each oxygen sensor with time.

In order to overcome the conventional problem, there has been proposed a technique of carrying out atmosphere correction in order to calibrate the relation between oxygen concentration and the output value of an oxygen sensor when the supply of fuel to an internal combustion engine is stopped and the interior of an exhaust passage is estimated to be in substantially the same condition as the atmosphere (for example, see Patent Document 1).

[Patent Document 1] Japanese Patent Application Laid-Open (kokai) No. 2007-32466 (paragraph 0040)

DISCLOSURE OF THE INVENTION

Problems to be Solved by the Invention

In the atmosphere correction method described in Patent Document 1, a comparison is merely made between a reference output value Vstd output by a standard oxygen sensor in the atmosphere, and the current output value Vsen (that is, one output value) of an oxygen sensor during a fuel cut operation in which fuel supply is stopped, so as to calculate a correction coefficient.

However, even during fuel cut (during a fuel cut period), the output value of the oxygen sensor may fluctuate as a result of operation of an internal combustion engine, or the output value may include noise. Therefore, the method of calculating a correction coefficient by merely comparing a single output value of an oxygen sensor during fuel cut with a reference output value encounters difficulty in obtaining an accurate correction coefficient.

An object of the present invention is to provide an oxygen sensor control apparatus which can accurately calibrate the relation between oxygen concentration and output of an oxygen sensor by making use of an output value from the oxygen sensor acquired when a fuel cut operation is performed so as to stop supply of fuel to an internal combustion engine.

Means for Solving the Problems

In order to solve the above-described problems, the present invention provides an oxygen sensor control apparatus which obtains, when a fuel cut operation is performed so as to stop supply of fuel to an internal combustion engine, a correction coefficient used to calibrate the relation between oxygen concentration and an actual output value of an oxygen sensor attached to an exhaust pipe of the internal combustion engine and which detects the oxygen concentration of exhaust gas flowing through the exhaust pipe by making use of the actual output value and the correction coefficient, the apparatus being characterized by comprising average output value calculation means for excluding, from a plurality of actual output values of the oxygen sensor acquired during a single period of the fuel cut operation or a plurality of concentration corresponding values which represent oxygen concentrations calculated from the actual output values acquired during a single period of the fuel cut operation, those values which fall outside a predetermined first range, and for calculating an average output value by averaging the remaining values; inter-fuel-cut average output value calculation means for calculating an inter-fuel-cut average output value by averaging a plurality of average output values calculated for a predetermined number of times of the fuel cut operation; and correction coefficient calculation means for obtaining a new correction coefficient for correcting the actual output value of the oxygen sensor, on the basis of the inter-fuel-cut average output value and a reference output value set in advance.

In general, even when a fuel cut operation (so-called fuel cut) for stopping the supply of fuel to an internal combustion engine is performed, the output (output waveform) of the oxygen sensor may fluctuate as a result of operation at the time of the fuel cut, or the actual output value output from the oxygen sensor may contain noise. In view of this, in the present invention, from a plurality of actual output values of the oxygen sensor acquired during a single period of the fuel cut operation or a plurality of concentration corresponding values which represent oxygen concentrations calculated from the actual output values acquired during a single period of the fuel cut operation, those values which fall outside a predetermined first range are excluded, and the average output value is calculated by averaging the remaining values. Thus, the influence of noise or fluctuation of the output waveform of the oxygen sensor is eliminated or mitigated. Furthermore, even when the fuel cut operation for stopping the supply of fuel to an internal combustion engine is performed, there arise some variations (deviations) in the operating conditions of the internal combustion engine immediately before the fuel cut operation. In view of this, in the present invention, a plurality of average output values calculated for a predetermined number of times of the fuel cut operation are further averaged so as to obtain an inter-fuel-cut average output value, and a new correction coefficient is obtained on the basis of the inter-fuel-cut average output value and a reference output value set in advance. Therefore, according to the oxygen sensor control apparatus of the present invention, an accurate correction coefficient can be calculated.

Notably, in the present invention, the "concentration corresponding values which represent oxygen concentrations calculated from the actual output values" and which are determined to fall within the first range may be values obtained by multiplying the individual actual output values of the implemented oxygen sensor by the current correction coefficient set in the oxygen sensor control apparatus (when a new correction coefficient is obtained, the correction coefficient is used as the current correction coefficient). Alternatively, the concentration corresponding values may be values obtained by multiplying the actual output values by a predetermined amplification factor or values obtained by multiplying the multiplied actual output values by the above-mentioned correction coefficient.

In the oxygen sensor control apparatus of the present invention, the inter-fuel-cut average output value calculation means may be configured to average the plurality of average output values, excluding those which fall outside a predetermined second range which is contained in the first range and is narrower than the first range.

When the second range narrower than the first range is applied to the average output value obtained by averaging the actual output values or output corresponding values within the first range so as to remove the influence of fluctuation and noise as described above, the inter-fuel-cut average output value can be calculated, while average output values containing errors are removed. Therefore, more stable calculation of the correction coefficient can be performed.

In the oxygen sensor control apparatus of the present invention, the correction coefficient calculation means may be configured such that, when the inter-fuel-cut average output value deviates from a predetermined third range a predetermined number of times continuously, the correction coefficient calculation means obtains the correction coefficient by use of at least one of a plurality of the inter-fuel-cut average output values deviating from the third range.

The deterioration of the oxygen sensor with time tends to occur very slowly. If the calculation and update of the correction coefficient is performed every time the fuel cut operation is performed, processing load increases. In view of this, in the present invention, the correction coefficient is calculated only when the inter-fuel-cut average output value deviates from the third range a predetermined number of times continuously. Thus, it becomes possible to reduce processing load, and to suppress the possibility that the correction coefficient is calculated when the inter-fuel-cut average output value accidentally deviates from the third range only one time, and the correction coefficient is updated to an intended value. Notably, preferably, the third range is set to extend from the reference output value such that the reference output value is located at the center of the third range.

Also, when the correction coefficient is calculated from the inter-fuel-cut average output values deviating from the third range and the previously set reference output value, one (e.g., the latest inter-fuel-cut average output value deviating from the third range) of the inter-fuel-cut average output values deviating from the third range may be used, or two or more of the inter-fuel-cut average output values deviating from the third range a plurality of times continuously may be used.

In the oxygen sensor control apparatus of the present invention, the average output value calculation means may be configured to calculate the average output value from the plurality of actual output values of the oxygen sensor acquired at predetermined intervals or the plurality of concentration corresponding values which represent oxygen concentrations calculated from the actual output values acquired at predetermined intervals, after a predetermined period of time has elapsed after start of the fuel cut operation.

The average output value is calculated from the actual output values or the concentration corresponding values which are acquired after a predetermined period of time has elapsed after start of the fuel cut operation (single fuel cut), the period of time being properly determined on the basis of a time necessary for exhaust gas present around the oxygen sensor to become close to the atmospheric air in terms of composition or to be replaced with the atmospheric air. Therefore, the average output value can be calculated in a relatively stable state after the fuel cut operation in which the actual output value does not fluctuate greatly. Thus, a stable correction coefficient can be calculated.

In the oxygen sensor control apparatus of the present invention, preferably, the first range is set to extend from the reference output value such that the reference output value is located at the center of the first range.

Since the first range is set to extend from the reference output value such that the reference output value is located at the center of the first range, the influence of noise and fluctuation of the output waveform of the oxygen sensor during fuel cut periods can be eliminated or mitigated, whereby a more stable correction coefficient can be obtained.

In the oxygen sensor control apparatus of the present invention, preferably, the second range is defined to extend from the reference output value such that the reference output value is located at the center of the second range.

Since the second range is set to extend from the reference output value such that the reference output value is located at the center of the second range, average output values containing errors can be removed effectively, whereby a more stable correction coefficient can be obtained.

Effect of the Invention

According to the present invention, an inter-fuel-cut average output value is calculated on the basis of actual output values of the oxygen sensor (or concentration corresponding values) acquired when a fuel cut operation is performed so as to stop supply of fuel to an internal combustion engine, and a correction coefficient is calculated by making use of the inter-fuel-cut average output value. Therefore, it is possible to obtain a correction coefficient which allows accurate calibration of the relation between the output of the oxygen sensor and oxygen concentration. Thus, satisfactory detection accuracy of the oxygen sensor can be maintained for a long period of time.

MODE FOR CARRYING OUT THE INVENTION

An embodiment of the present invention will now be described.

Figure 1:
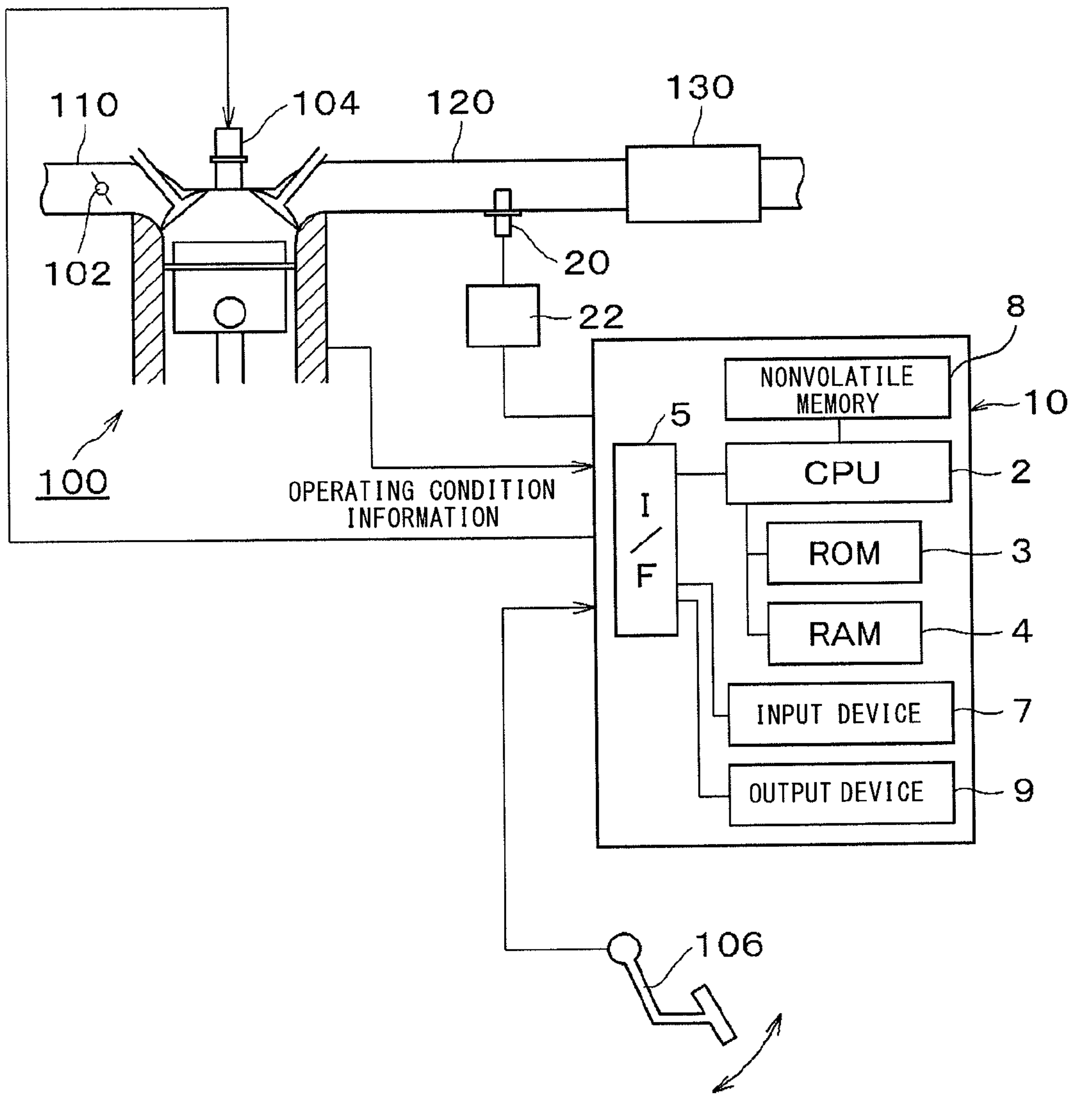
FIG. 1 Diagram showing the overall configuration of a system including an oxygen sensor control apparatus according to an embodiment of the present invention.

FIG. 1 is a diagram showing the overall configuration of a system including an oxygen sensor control apparatus 10 according to an embodiment of the present invention. An oxygen sensor (hereinafter may be referred to as an "implemented oxygen sensor") 20 is attached to an exhaust pipe 120 of an internal combustion engine 100 of a vehicle, and a controller 22 is connected to the implemented oxygen sensor 20. An oxygen sensor control apparatus (ECU; engine control unit) 10 is connected to the controller 22.

A throttle valve 102 is provided in an intake pipe 110 of the engine 100, and an injector 104 for supplying fuel into a cylinder is provided for each cylinder of the engine 100. Furthermore, an exhaust gas purification catalyst 130 is attached to a downstream side of the exhaust pipe 120. Moreover, various unillustrated sensors (a pressure sensor, a temperature sensor, a crank angle sensor, etc.) are provided on the engine 100. Information representing operating conditions (pressure of the engine, temperature, and rotational speed of the engine, vehicle speed, etc.) output from these sensors are input to the ECU 10. The ECU 10 controls the amount of fuel injected from the injector 104 in accordance with, among other factors, the above-described operating condition information, the oxygen concentration of the exhaust gas detected by the implemented oxygen sensor 20, and an amount by which an accelerator pedal 106 is stepped on by a driver. Thus, the engine 100 is operated at a proper air-fuel ratio.

The ECU 10 is a unit in which a microcomputer and a nonvolatile memory 8 composed of EEPROM or the like are mounted on a circuit board. The microcomputer includes a central processing unit (CPU) 2, ROM 3, RAM 4, an external interface circuit (I/F) 5, an inputting device 7 for inputting signals from the outside, and an output device 9. In accordance with programs stored in the ROM 3 in advance, the ECU 10 (CPU 2) processes input signals and outputs from the output device 9 a signal for controlling the amount of fuel injected by the injector 104. The ECU 10 also performs atmosphere correction processing, which will be described later.

The implemented oxygen sensor 20 may be a so-called two-cell-type air-fuel-ratio sensor which includes two cells each composed of an oxygen-ion conductive solid electrolyte body and a pair of electrodes formed thereon. More specifically, the air-fuel-ratio sensor includes a gas detection element and a housing which holds the gas detection element therein and which is attached to the exhaust pipe 102. The gas detection element is configured such that an oxygen pump cell and an oxygen concentration detection cell are stacked via a hollow measurement chamber into which exhaust gas is introduced via a porous member, and a heater is stacked on the two cells so as to heat the two cells to an activation temperature. Notably, in the present invention, the oxygen sensor 20 mounted to an actual individual internal combustion engine is referred to as an "implemented oxygen sensor" in order to distinguish the oxygen sensor 20 from a reference oxygen sensor to be described later.

The implemented oxygen sensor 20 is connected to the well known controller 22, which is a direction circuit including various resistors, differential amplifiers, etc. The controller 22 supplies a pump current to the implemented oxygen sensor 20, and converts the pump current to a voltage, which is output to the ECU 10 as an oxygen concentration detection signal. More specifically, the controller 22 drives and controls the implemented oxygen sensor 20 in a known manner. The controller 22 controls the supply of electricity to the oxygen pump cell such that the output of the oxygen concentration detection cell becomes constant. The oxygen pump cell operates to pump oxygen out of the measurement chamber to the outside or to pump oxygen into the measurement chamber. The pump current which flows through the oxygen pump cell at that time is converted to a voltage via a detection resistor. The voltage is output to the ECU 10.

Next, an atmosphere correction method (a method for calculating a correction coefficient) for the implemented oxygen sensor 20 will be described. The atmosphere correction is processing for calculating a correction coefficient for calibrating the relation between oxygen concentration and the output (actual output value) of the implemented oxygen sensor 20 attached to the internal combustion engine 100. The processing is performed when a fuel cut operation (fuel cut; hereafter abbreviated "F/C") is performed in order to stop supply of fuel to the internal combustion engine 100 under specific operating conditions. In the atmosphere correction, the correction coefficient is obtained such that the correction coefficient eliminates the difference in output characteristic between the implemented oxygen sensor 20 attached to the internal combustion engine 100 and an ideal oxygen sensor (hereinafter referred to as the "reference oxygen sensor"); i.e., an oxygen sensor which has the same structure as the implemented oxygen sensor 20 and whose output characteristic corresponds to the average of output characteristics of a plurality of oxygen sensors which vary due to manufacture-related variations. The actual output value of the implemented oxygen sensor 20 in periods in which the internal combustion engine is operated is corrected by use of the obtained correction coefficient.

No particular limitation is imposed on the value of the correction coefficient, and any value may be used so long as the correction coefficient can eliminate the difference between the output characteristic of the reference oxygen sensor and the output characteristic of the implemented oxygen sensor 20. For example, the following correction coefficient Kp cab be used. That is, in the present embodiment, in order to enable the atmosphere correction to be performed when the internal combustion engine 100 is operated, a correction coefficient Kp is stored in the nonvolatile memory 8 of the ECU 10 in advance. The correction coefficient Kp is represented by (a reference oxygen output value Ipso obtained when the reference oxygen sensor is exposed to a specific atmosphere having a known oxygen concentration)/(an output value Ipro obtained when the implemented oxygen sensor 20 is exposed to an atmosphere whose oxygen concentration is substantially the same as the specific atmosphere). An example of the "specific atmosphere having a known oxygen concentration" is air (whose oxygen concentration is about 20.5%). However, the "specific atmosphere having a known oxygen concentration" may be an oxygen atmosphere having a predetermined concentration which differs from the atmosphere. The reference oxygen sensor may be exposed to the above-described "specific atmosphere having a known oxygen concentration" by means of attaching the reference oxygen sensor to a predetermined measurement system and exposing the sensor to that atmosphere (e.g., air).

Meanwhile, the "atmosphere whose oxygen concentration is substantially the same as the specific atmosphere" and to which the implemented oxygen sensor 20 is exposed may refer not only to an oxygen atmosphere whose oxygen concentration is equal to that of the atmosphere to which the reference oxygen sensor is exposed, but also to an atmosphere whose oxygen concentration deviates ±5.0% (more preferably, ±1.0%) from that of the oxygen atmosphere to which the reference oxygen sensor is exposed. The implemented oxygen sensor 20 may be exposed to the "atmosphere whose oxygen concentration is substantially the same as the specific atmosphere" by means of attaching the oxygen sensor to a predetermined measurement system and exposing the sensor to that atmosphere (e.g., air) as in the case of the reference sensor, or by means of attaching the implemented oxygen sensor 20 to the exhaust pipe 102 of the actual internal combustion engine 100, and passing a gas through the exhaust pipe 120 to thereby create the above-described oxygen atmosphere within the exhaust pipe 120 and expose the implemented oxygen sensor 20 to the created atmosphere.

Figure 2:
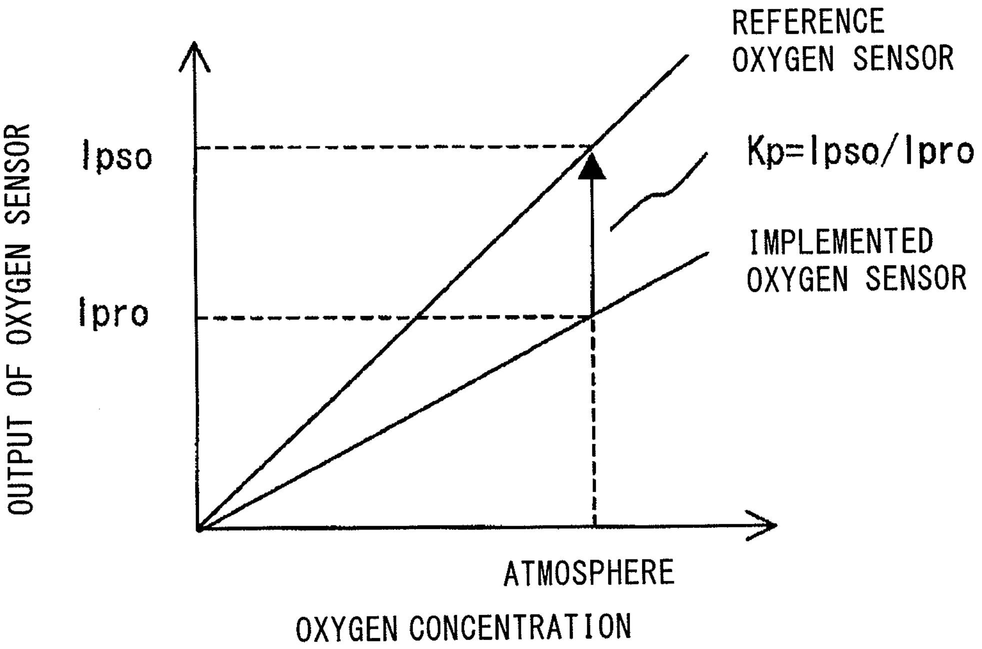
FIG. 2 Chart showing a method for obtaining a correction coefficient Kp in advance.

Notably, when the atmosphere correction processing is executed while the internal combustion engine 100 is operated and a new correction coefficient Kq to be described later is obtained, the correction coefficient Kq is used as a new value of the correction coefficient Kp for update. However, in the present embodiment, before shipment of the internal combustion engine 100, an initial value of the correction coefficient Kp is stored in the nonvolatile memory 8 by the following procedure. Specifically, the reference oxygen sensor is attached to a predetermined measurement system, and is exposed to air so as to obtain a reference oxygen output value Ipso as shown in FIG. 2. Subsequently, the implemented oxygen sensor 20 is attached to the exhaust pipe 120 of the internal combustion engine 100 before shipment (more specifically, at the time of shipment inspection), and the internal combustion engine 100 is then operated. Subsequently, the oxygen concentration of the gas flowing through the exhaust pipe is made substantially equal to that of air by means of opening the throttle value substantially completely in a state in which fuel supply is stopped, or maintaining, for a long period of time, the state in which fuel supply is stopped. The output value Ipro of the implemented oxygen sensor 20 obtained at that time is detected (see FIG. 2). As shown in FIG. 2, the correction coefficient Kp is obtained by an expression (the reference oxygen output value Ipso)/(the output value Ipro of the implemented oxygen sensor 20); i.e., by means of dividing the reference oxygen output Ipso by the output value Ipro of the implemented oxygen sensor 20. This correction coefficient Kp is stored in the nonvolatile memory 8. The initial value of the correction coefficient Kp stored in the nonvolatile memory 8 in this manner is used as a correction coefficient for correcting the actual output value of the implemented oxygen sensor 20 until the correction coefficient is updated (a new value of the correction coefficient is overwritten).

In the present embodiment, a fuel cut reference output value Ipsf is also stored in the nonvolatile memory 8 of the ECU 10 in advance as a reference output value to be compared with the actual output value of the implemented oxygen sensor 20 when the internal combustion engine 100 to which the implemented oxygen sensor 20 is attached is in a fuel cut period. This fuel cut reference output value Ipsf is also stored in the nonvolatile memory 8 before shipment of the internal combustion engine 100. In the present embodiment, after the correction coefficient Kp is calculated by the above-described procedure, the fuel cut reference output value Ipsf is obtained by means of intentionally performing F/C in a state in which the implemented oxygen sensor 20 is attached to the exhaust pipe 120 of the internal combustion engine 100. Specifically, at the time of shipment inspection of the internal combustion engine 100, the operation of the internal combustion engine 100 is started in a state in which the implemented oxygen sensor 20 for which the correction coefficient Kp has been obtained in the above-described manner is attached to the exhaust pipe 120 of the internal combustion engine 100. Subsequently, F/C is performed manually or mechanically under specific operating conditions, and the actual output values of the implemented oxygen sensor 20 are obtained at predetermined intervals after a point in time (e.g., 4 seconds after the start of F/C) at which the gas discharged from the cylinders after the F/C is expected to have reached the surrounding of the implemented oxygen sensor 20. The obtained actual output values of the implemented oxygen sensor 20 are multiplied by the correction coefficient Kp to thereby obtain a plurality of values. These values are averaged to thereby obtain the fuel cut reference output value Ipsf. The fuel cut reference output value Ipsf obtained in this manner is stored in the nonvolatile memory 8. Notably, the fuel cut reference output value Ipsf corresponds to the "reference output value" in the claims.

Notably, in the internal combustion engine 100, in accordance with the operating conditions such as deceleration of the vehicle and the amount of intake air, the ECU 10 outputs an instruction for making the amount of fuel injected from the injector 104 zero. It is possible to determine whether or not F/C has been started, by detecting whether or not that instruction is output. Incidentally, F/C is started under various operating conditions. If the specific operating conditions at the start of F/C which was performed at the time of shipment inspection of the internal combustion engine 100 in order to calculate the above-mentioned fuel cut reference output value Ipsf differ from the specific operating conditions at the start of F/C which was performed during traveling (operation) after shipment of the internal combustion engine 100 and during which the atmosphere correction processing to be described later is executed, the atmosphere correction processing cannot be performed under the same condition, and the accuracy of the atmosphere correction (in other words, the calculation accuracy of an average output value Ipav, an inter-fuel-cut average output value Ipavf, and a correction coefficient Kq, which will be described later) drops. Accordingly, in the present embodiment, only when the fuel cut is performed under predetermined operating conditions, the processing of calculating the average output value Ipav, the inter-fuel-cut average output value Ipavf, and the fuel cut reference output value Ipsf, and calculating the correction coefficient Kq to be described later is executed. However, the fuel cut is not necessarily required to be performed in the same operating conditions. The present embodiment may be modified such that the actual output value Ip of the implemented oxygen sensor 20 is obtained in a plurality of fuel cut operations performed under each of different conditions, and the average output value Ipav, the inter-fuel-cut average output value Ipavf, the fuel cut reference output value Ipsf, the correction coefficient Kq, etc. are calculated therefrom. Notably, the determination as to whether F/C has been started under specific operating conditions during operation of the internal combustion engine 100 is made as follows. When at least one parameter which represents the operating state of the internal combustion engine, such as engine speed, engine load, or intake air amount, immediately before F/C was started (F/C was determined to have been started) satisfies a predetermined condition (that is, a predetermined condition previously set in order to obtain the fuel cut reference output value Ipsf), the F/C can be determined to have been started under the predetermined operating conditions.

Figure 6:
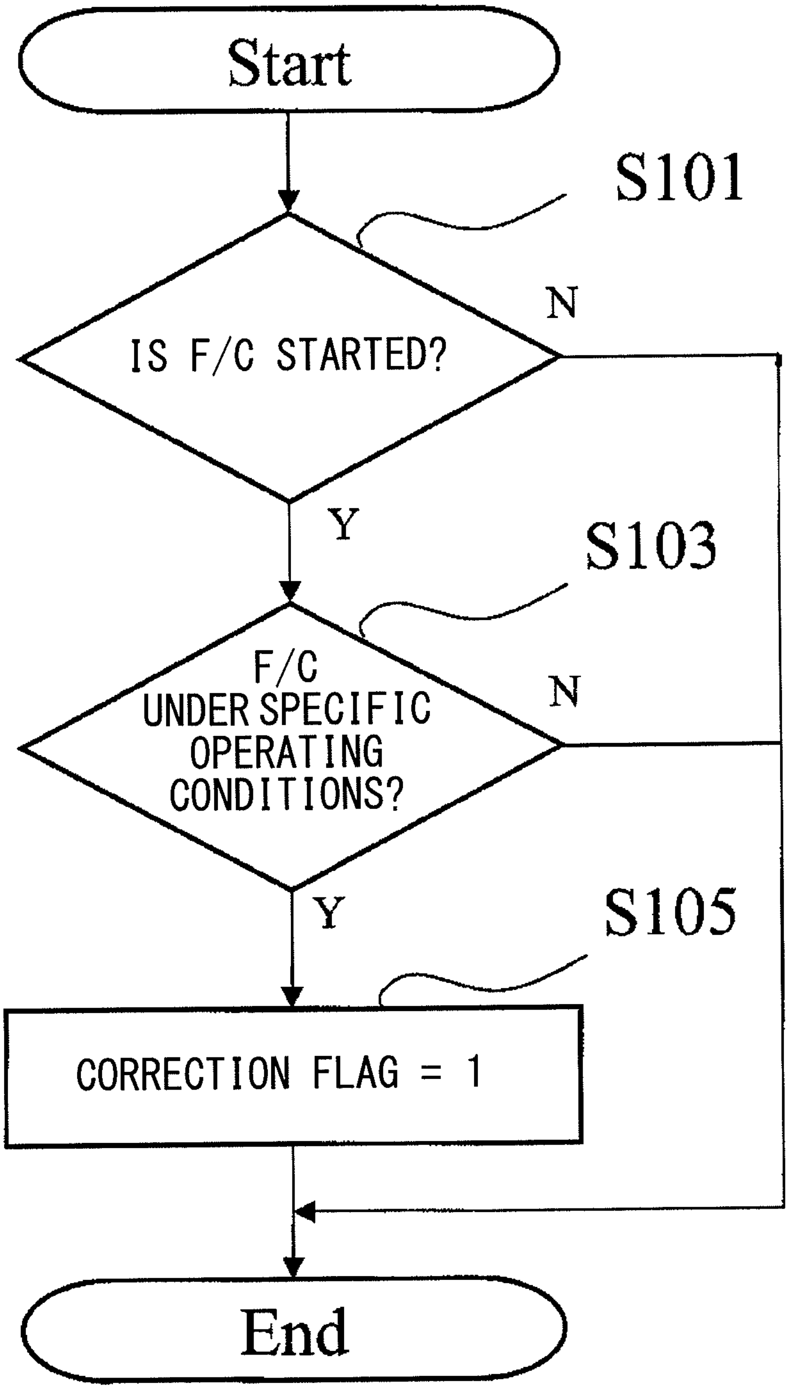
FIG. 6 Flowchart showing processing of determining whether to execute atmosphere correction processing.
Figure 7A:
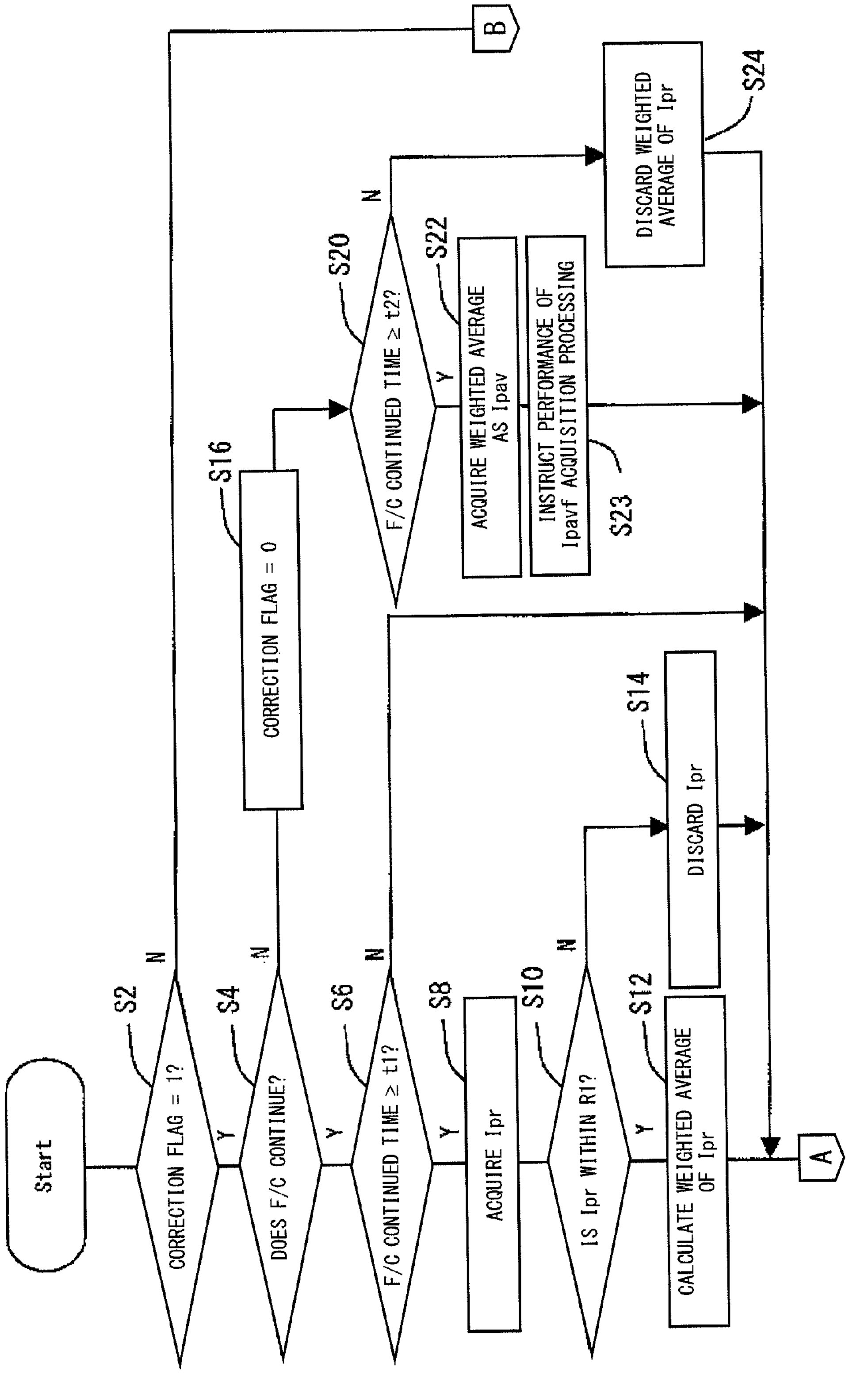
FIGS. 7A and 7B Flowcharts showing the atmosphere correction processing which calculates a correction coefficient Kq on the basis of a value Ipr obtained by multiplying an actual output value of an implemented oxygen sensor by a correction coefficient Kp, and using the correction coefficient Kq as a new correction coefficient Kp for update.
Figure 7B:
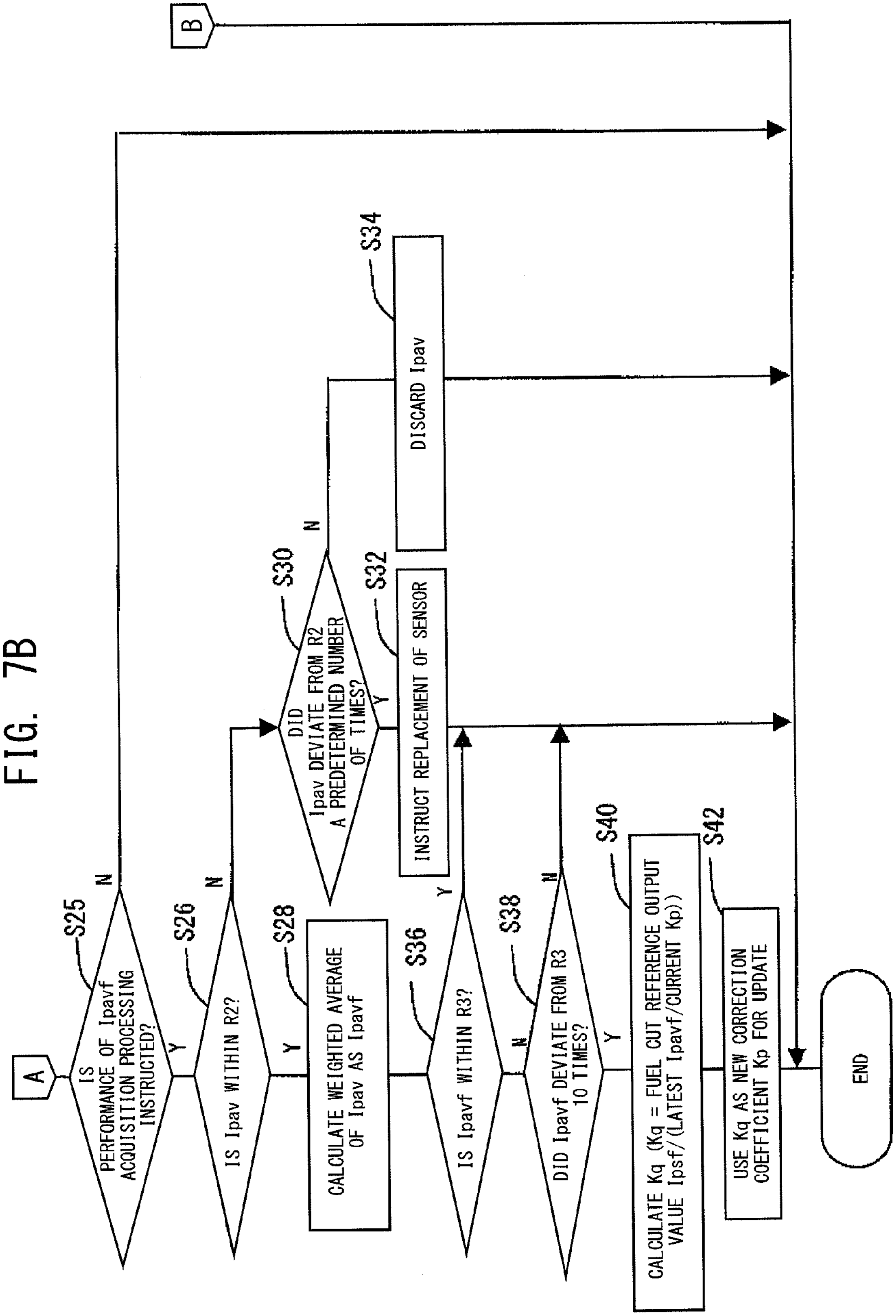

Next, the outline of the atmosphere correction processing which is executed by the CPU 2 of the ECU 10, while the vehicle (the internal combustion engine 100) is traveling, will be described with reference to the flowcharts of FIG. 6 and FIGS. 7A and 7B. The CPU 2 executes the atmosphere correction processing by making use of the average output value Ipav and the inter-fuel-cut average output value Ipavf in the state in which the correction coefficient Kp and the fuel cut reference output value Ipsf are stored in the nonvolatile memory 8. Notably, FIG. 6 is a flowchart showing processing for determining whether to execute the atmosphere correction processing, and FIGS. 7A and 7B are flowcharts showing the atmosphere correction processing for calculating the correction coefficient Kg by making use of the average output value Ipav and the inter-fuel-cut average output value Ipavf. The processing represented by these flowcharts is started after the power of the ECU 10 is turned on, and is repeatedly executed at predetermined intervals (e.g., 1 msec).

First, as shown in FIG. 6, the CPU 2 determines in step S101 whether or not F/C has been started during operation of the internal combustion engine 100. As described above, this determination is performed by determining whether or not the instruction for making the amount of fuel injected from the injector 104 zero has been output. When F/C is determined to have been started ("Yes" in step S101), the CPU 2 proceeds to step S103 so as to determine whether or not the F/C was performed under the predetermined operating conditions. As described above, this determination is made by determining whether or not at least one parameter which represents the operating state of the internal combustion engine, such as engine speed, engine load, or intake air amount, immediately before F/C was started (F/C was determined to have been started) satisfies a predetermined condition. When the F/C is determined to have been performed under the predetermined operating conditions ("Yes" in step S103), the CPU 2 proceeds to step S105 so as to set a correction flag to "1." Notably, when the power of the ECU 100 is turned on, the correction flag is set to 0. Meanwhile, when either the determination made in step S101 or the determination made in step S103 is "No," the CPU 2 ends the present processing, and repeatedly executes the processing from the beginning.

Next, the processing shown by the flowcharts of FIGS. 7A and 7B will be described. First, the CPU 2 determines in step S2 whether or not the correction flag is "1." When the correction flag is "1" ("Yes" in step S2), the CPU 2 proceeds to step S4. The correction flag is set to "1" in step S105 of FIG. 6. Meanwhile, when the correction flag is "0" ("No" in step S2), the CPU 2 ends the present processing. The CPU 2 determines in step S4 whether or not the F/C is continued. When the F/C is continued ("Yes" in step S4), the CPU 2 proceeds to step S6. In step S6, the CPU 2 determines whether or not the duration of the F/C performed under the specific operating conditions (corresponding to a "predetermined period of time after start of the fuel cut operation" in the claims) is equal to or greater than t1. Notably, in the present embodiment, t1 is set to 4 sec.

The reason why the CPU 2 waits until the F/C duration time reaches t1 is as follows. Even when the F/C is started, a combustion gas produced before the F/C remains in the exhaust pipe 120, etc., and time is needed for the combustion gas to become close to fresh air (atmospheric air) in terms of composition or to be replaced with the fresh air. Therefore, the oxygen concentration within the exhaust pipe 120 approaches the oxygen concentration of the atmospheric air with delay. Therefore, the actual output value (output waveform) of the implemented oxygen sensor 20 gradually increases as the oxygen concentration within the exhaust pipe 120 increases after the start of the F/C, and, when the oxygen concentration within the exhaust pipe 120 becomes substantially equal to that of the atmospheric air, the output waveform of the implemented oxygen sensor 20 becomes substantially stable although it is affected by fluctuation of the actual output value. Therefore, after the F/C was started under the specific operating conditions, the CPU 2 determines in step S6 whether or not the F/C has been continued for time t1; i.e., until the combustion gas within the exhaust pipe 120 is expected to become close to the atmospheric air in terms of composition, or be replaced with the atmospheric air.

Referring back to FIGS. 7A and 713, when the CPU 2 makes an affirmative determination in step S6 ("Yes" in step S6), the CPU 2 acquires an output corresponding value Ipr which corresponds to the output of the implemented oxygen sensor 20 (step S8). Notably, the output corresponding value Ipr is repeatedly acquired at predetermined intervals (e.g., 1 msec) so long as the F/C under the specific operating conditions continues. The output corresponding value Ipr is a value obtained by multiplying the actual output value Ip output from the implemented oxygen sensor 20 by the current correction coefficient Kp stored in the nonvolatile memory 8. That is, the output corresponding value Ipr obtained by multiplying the actual output value Ip by the current correction coefficient Kp corresponds to the "concentration corresponding values which represent oxygen concentrations calculated from the actual output values" in the claims.

Next, the CPU 2 determines whether or not the output corresponding value Ipr acquired in step S8 falls within a predetermined first range R1. When the output corresponding value Ipr is determined to fall within the predetermined first range R1 ("Yes" in step S10), the CPU 2 performs processing for calculating the weighted average of the output corresponding value Ipr (step S12). Meanwhile, when the output corresponding value Ipr is determined not to fall within the predetermined first range R1 ("No" in step S10), the CPU 2 proceeds to step S14 so as to discard the output corresponding value Ipr acquired in step S8.

Figure 3:
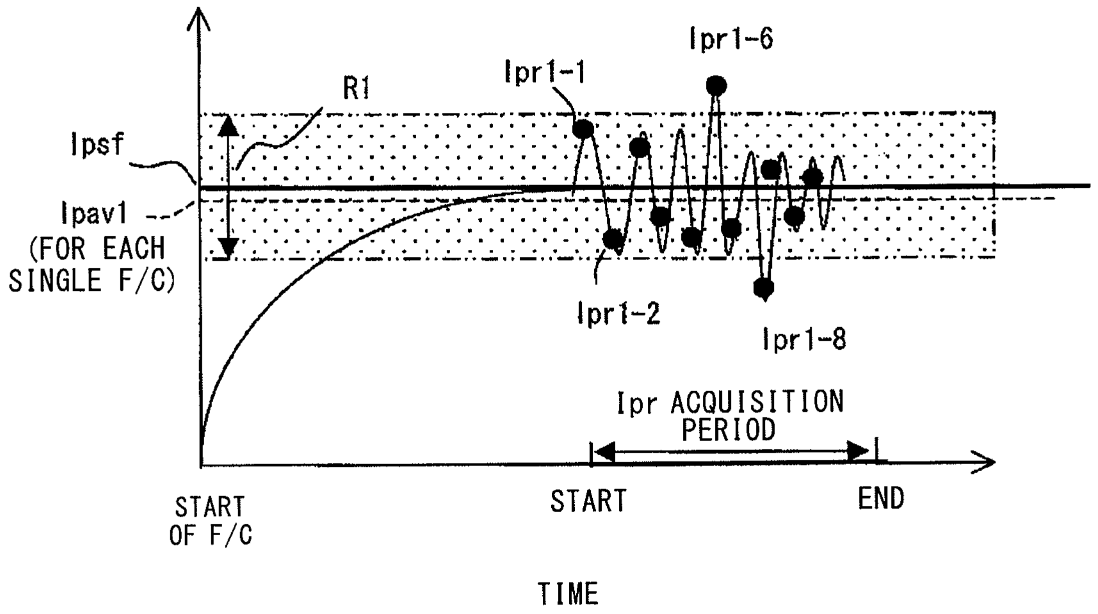
FIG. 3 Chart showing a method for averaging a value Ipr obtained by multiplying an actual output value of an implemented oxygen sensor by a correction coefficient Kp.

In general, even when F/C is started under predetermined operating conditions, the individual actual output value Ip (therefore, output corresponding value Ipr) of the implemented oxygen sensor 20 may fluctuate or may contain noise. In view of this, in the present embodiment, an average output value Ipav is obtained by averaging a plurality of output corresponding values Ipr acquired during a single fuel cut period. This processing eliminates or mitigates the influence of fluctuation and noise, whereby a stable value representing the output of the implemented oxygen sensor 20 in the single F/C is obtained. Specifically, as shown in FIG. 3, individual actual output values Ip obtained in a single fuel cut period are multiplied by the current correction coefficient Kp to thereby obtain values Ipr1-1, Ipr1-2, etc. Of these values, those which fall within the predetermined first range R1 (in other words, only the output corresponding values Ipr for which the affirmative determination ("Yes") is made in step S10) are selected, and the average output value Ipav is calculated therefrom. Notably, in the present embodiment, the upper limit and lower limit of the range R1 are set on the basis of predetermined variations from the fuel cut reference output value Ipsf (the central value) represented in percentage (for example, the upper limit is a value obtained by adding 7.5% of the fuel cut reference output value Ipsf, and the lower limit is a value obtained by subtracting 7.5% of the fuel cut reference output value Ipsf).

As shown in FIG. 3, two values Ipr1-1 and Ipr1-2 of the output corresponding value Ipr1 obtained by multiplying, by the correction coefficient Kp, the actual output values Ip of the implemented oxygen sensor 20 obtained in a single fuel cut period deviate (fluctuate) upward and downward, respectively. However, the influence of the fluctuation can be eliminated by means of averaging the two values. Further, each of two output corresponding values Ipr1-6 and Ipr1-8 is assumed to contain noise or to be erroneously detected by the implemented oxygen sensor 20. Since these values deviate from the range R1, they are not used for calculation of the average output value Ipav, and are discarded in step S14.

Next, in step S12, the CPU 2 executes processing for calculating the weighted average of output corresponding values Ipr (specifically, processing for calculating the weighted average of 128 output corresponding values Ipr). This processing is performed in accordance with, for example, the following Expression 1. The value obtained by calculating the weighted average of output corresponding values Ipr will be referred to as a weighted average value Ipav corresponding to an average output value of step S22, which will be described later.

$$Ipav = \frac{1}{128} \times \{\text{latest } Ipr - Ipav(n-1)\} + Ipav(n-1) \quad (1)$$

Ipav(n−1) of the above-described Expression 1 represents the weighted average value calculated in a previous processing cycle (immediately before the current processing cycle). Notably, since Ipav(n−1) does not exist immediately after the start of this atmosphere correction processing, the weighted average value Ipav is obtained, while the first obtained Ipr is used as Ipav(n−1).

When the processing of step S12 ends, when a negative determination is made in step S6 ("No" in step S6), or when the processing of step S14 ends, the CPU 2 proceeds to step S25.

Meanwhile, when the CPU 2 determines in step S4 that the F/C does not continue ("No" in step S4), the CPU 2 sets the correction flag to "0" (step S16), and then proceeds to step S20. In step S20, the CPU 2 determines whether or not the duration time of the F/C performed under the specific operating conditions is equal to or greater than t2. Notably, t2 is longer than t1, and, in the present embodiment, is set to 5 sec. When the duration time is equal to or greater than t2 ("Yes" in step S20), the CPU 2 acquires, as the average output value Ipav, the weighted average value calculated in step S12 (step S22). When the duration time is less than t2 ("No" in step S20), the CPU 2 discards the weighted average value calculated in step S12, because the weighted average value of the output corresponding values Ipr calculated in step S12 is not an average of a sufficient number of output corresponding values Ipr (step S24).

Next, after completion of the processing of step S22, the CPU 2 instructs execution of Ipavf acquisition processing for obtaining the inter-fuel-cut average output value Ipavf (step S23). After completion of the processing of step S23 or step S24, the CPU 2 proceeds to step S25. In step S25, the CPU 2 determines whether or not execution of the Ipavf acquisition processing was instructed in step S23. When execution of the Ipavf acquisition processing was instructed ("Yes" in step S25), the CPU 2 proceeds to step S26. When execution of the Ipavf acquisition processing was not instructed ("No" in step S25), the CPU 2 ends the processing.

In step S26, the CPU 2 determines whether or not the weighted average value Ipav used for calculation of the correction coefficient Kq falls within a predetermined second range R2. When the weighted average value Ipav falls within the second range R2 ("Yes" in step S26), the CPU 2 proceeds to step S28.

Figure 4:
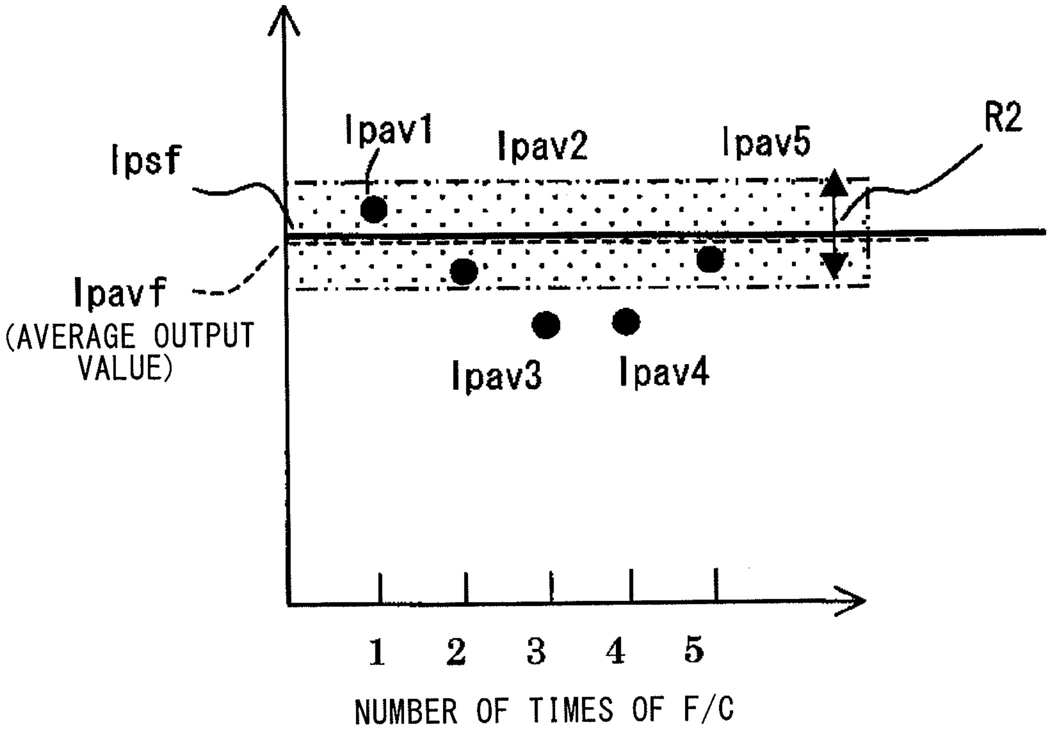
FIG. 4 Chart showing a method for calculating an inter-fuel-cut average output value Ipavf by averaging average output values Ipav each obtained by the method shown in FIG. 3 in a single fuel cut operation.

Even when F/C is repeatedly performed under the specific operating conditions, as shown in FIG. 4, a variation may arise among the individual weighted average values (Ipav1, Ipav2, etc.) obtained in step S22 due to variations (deviations) of the operating conditions of the internal combustion engine 100. In view of this, of the individual weighted average values (Ipav1, Ipav2, etc.), only the values which fall within the predetermined second range R2 are acquired and used for calculation of the inter-fuel-cut average output value Ipavf. Thus, the inter-fuel-cut average output value Ipavf can be calculated as a stable value. Notably, the upper limit and lower limit of the range R2 are set on the basis of predetermined variations from the fuel cut reference output value Ipsf (the central value) represented in percentage (for example, the upper limit is a value obtained by adding 2.0%, of the fuel cut reference output value Ipsf, and the lower limit is a value obtained by subtracting 2.0% of the fuel cut reference output value Ipsf). In this case, since two weighted average values Ipav3 and Ipav4 deviate from the range R2 as shown in FIG. 4, these weighted average values are not used for calculation of the inter-fuel-cut average output value Ipavf (a negative determination ("No") is made in step S26).

Notably, since the range R2 is applied to the average output value Ipav, which is obtained by averaging the output corresponding values Ipr within the range R1 so as to remove fluctuation, the range R2 is set to be included in the range R1 and to be narrower than the range R1 (R2<R1). Since the range R2 is narrower than the range R1 (R2<R1), the inter-fuel-cut average output value Ipavf can be calculated, while average output values Ipav containing errors are removed. Therefore, the reliability of the calculated inter-fuel-cut average output value Ipavf can be improved.

In step S28, the CPU 2 executes processing for calculating the weighted average of each of the weighted average value Ipav (specifically, processing for calculating the weighted average of 16 weighted average values Ipav). This processing is performed in accordance with, for example, the following Expression 2. The value obtained by calculating the weighted average of each of weighted average value Ipav will be referred to as the inter-fuel-cut average output value Ipavf.

$$Ipavf = \frac{1}{16} \times \{\text{latest } Ipav - Ipavf(n-1)\} + Ipavf(n-1) \quad (2)$$

Ipavf(n−1) of the above-described Expression 2 represents the weighted average value calculated in a previous processing cycle (immediately before the current processing cycle). Notably, since Ipavf(n−1) does not exist immediately after the start of this atmosphere correction processing, the weighted average value Ipavf is obtained, while the first obtained Ipav is used as Ipavf(n−1).

Meanwhile, when the weighted average value Ipav falls out of the second range R2 ("No" in step S26), the CPU 2 proceeds to step S30 in order to determine whether or not the number of times the CPU 2 has made a negative determination ("No") in step 26 has exceeded a predetermined number (step S30). The processing of step S30 corresponds to an operation of counting the number of weighted averages which fall out of the range R2 (Ipav3 and Ipav4) in FIG. 4. When the CPU 2 makes an affirmative determination ("Yes") in step S30, the CPU 2 determines that anomaly of the output of the implemented oxygen sensor 20 is assumed to have occurred frequently, and instructs replacement of the sensor (step S32). Subsequently, the CPU 2 ends the present processing. The replacement of the sensor may be instructed by providing a warning to a driver of the vehicle or providing a display which prompts the driver to replace the sensor.

Meanwhile, when the CPU 2 makes a negative determination ("No") in step S30, the CPU 2 proceeds to step S34 so as to discard the weighted average value (average output value) Ipav acquired in step S22, and ends the present processing.

After completion of the processing of step S28, in step S36, the CPU 2 determines whether or not the inter-fuel-cut average output value Ipavf acquired in step S28 falls within a predetermined third range R3.

Figure 5:
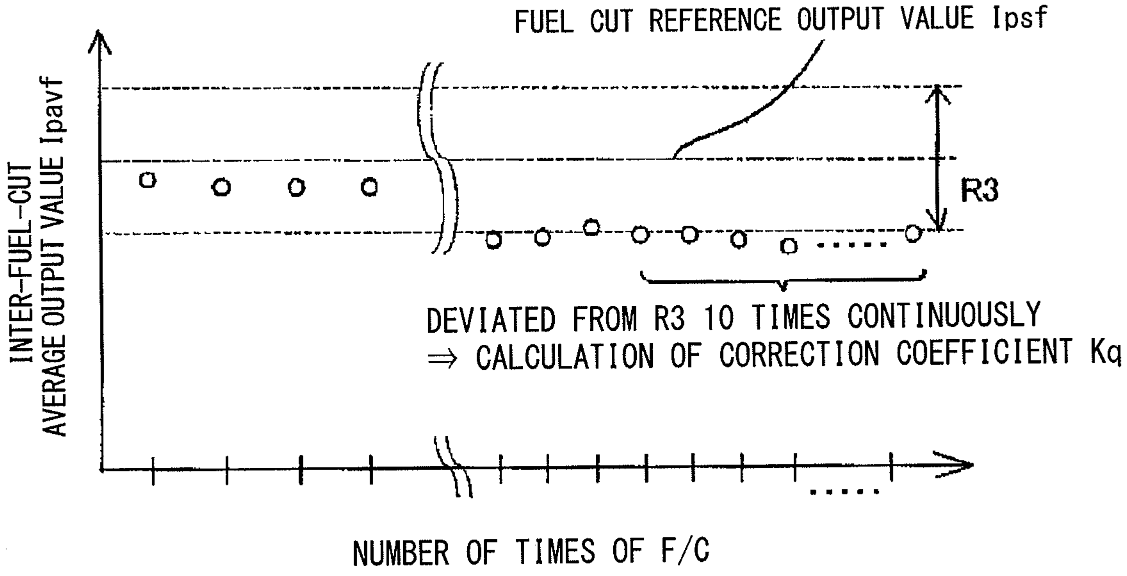
FIG. 5 Chart showing a method for determining whether or not the inter-fuel-cut average output value Ipavf obtained by the method shown in FIG. 4 deviates from a range R3, which is a correction determination range.

As shown in FIG. 5, the upper limit and lower limit of the range R3 are set on the basis of predetermined variations from the fuel cut reference output value Ipsf (the central value) represented in percentage (for example, the upper limit is a value obtained by adding 1.0% of the fuel cut reference output value Ipsf, and the lower limit is a value obtained by subtracting 1.0% of the fuel cut reference output value Ipsf). Notably, since the range R3 is used to determine whether to update the correction coefficient Kq in each F/C period, the range R3 is set to be included in the range R2 and to be narrower than the range R2 (R3<R2).

When the CPU 2 makes a negative determination in step S36 ("No" in step S36) and determines in step S38 that the inter-fuel-cut average output value Ipavf has deviated from the range R3 10 times continuously as shown in FIG. 5 ("Yes" in step S38), the CPU 2 proceeds to step S40, and executes processing for calculating a new correction coefficient Kq.

In step S40, the CPU 2 calculates the correction coefficient Kq by dividing the fuel cut reference output value Ipsf stored in the nonvolatile memory 8 by a value obtained by dividing the latest inter-fuel-cut average output value Ipavf (in other words, the tenth one of the inter-fuel-cut average output values Ipavf continuously deviated from the range R3) by the current correction coefficient Kp. The correction coefficient Kq calculated in this step S40 is stored (overwriting) in the nonvolatile memory 8 in step 42 as a new value of the correction coefficient Kp for update. Thus, after this point in time, the output corresponding value Ipr is calculated by correcting the actual output value Ip output from the implemented oxygen sensor 20 by the new value of the correction coefficient Kp, and the oxygen concentration of the exhaust gas is detected from the output corresponding value Ipr.

Meanwhile, when the CPU 2 makes an affirmative determination ("Yes") in step S36 or when the CPU 2 makes a negative determination ("No") in step S38, the CPU 2 ends the present processing. That is, the previous correction coefficient Kp is used without being updated.

As described above, in the oxygen sensor control apparatus 10 of the present embodiment, of a plurality of output corresponding values Ipr of the implemented oxygen sensor 20 acquired in a single fuel cut period, those which deviate from the first range R1 are removed, and the average output value Ipav is calculated on the basis of the remaining values. Further, the inter-fuel-cut average output value Ipavf is calculated from the average output value Ipav. A new correction coefficient Kg is obtained by comparing the inter-fuel-cut average output value Ipavf and the fuel cut reference output value Ipsf, and the correction coefficient is updated by making use of the new value. Thus, in the oxygen sensor control apparatus 10 of the present embodiment, the relation between oxygen concentration and the output of the oxygen sensor (the implemented oxygen sensor 20) can be calibrated accurately, and detection of oxygen concentration can be continued by making use of the accurate correction coefficient. Thus, satisfactory detection accuracy of the oxygen sensor can be maintained for a long period of time.

Notably, in the present embodiment, the CPU 2 and the processing of step S40 executed by the CPU 2 correspond to the "correction coefficient calculation means" in the claims; the CPU 2 and the processing of steps S10 and S12 executed by the CPU 2 correspond to the "average output value calculation means" in the claims; and the CPU 2 and the processing of steps S26 and S28 executed by the CPU 2 correspond to the "inter-fuel-cut average output value calculation means" in the claims. Further, Ipav corresponds to the average output value in the claims; and Ipavf corresponds to the inter-fuel-cut average output value in the claims.

Notably, the present invention is not limited to the above-described embodiment, and, needless to say, various modifications are possible. For example, the implemented oxygen sensor 20 is not limited to the above-described two-cell-type air-fuel-ratio sensor, and a single-cell, limiting-cutting-type air-fuel-ratio sensor may be used. In the above-described embodiment, each of the average output value Ipav and the inter-fuel-cut average output value Ipavf is obtained as a weighted average value. They are not limited to the weighted average value, and an arithmetic average or a moving average may be used.

In the above-described embodiment, the output corresponding value Ipr obtained by multiplying the actual output value Ip of the implemented oxygen sensor 20 by the correction coefficient Kp is determined to fall within the first range R1. The embodiment may be modified such that the numerical range of the first range R1 is properly changed; the first range R1 and the actual output values Ip are compared; the actual output values Ipr, excluding those which fall outside the first range R1, are averaged to thereby obtain a value; and the resultant value is multiplied by the correction coefficient Kp so as to obtain the average output value Ipav. In the above-described embodiment, times t1 and t2 used in step S6 and S20, respectively, so as to determine the F/C duration time are fixed value. However, these times t1 and t2 may be changed in accordance with, for example, engine speed immediately before the F/C was started under the specific operating conditions.

[Description Of Reference Numerals And Symbols]

2: CPU
3: ROM
8: nonvolatile memory
10: oxygen sensor control apparatus (ECU)
20: implemented oxygen sensor (oxygen sensor)
100: internal combustion engine
Kp, Kg: correction coefficient
Ipso: reference oxygen output value
Ipro: output value when the oxygen sensor is exposed to an atmosphere whose oxygen concentration is substantially the same as a specific atmosphere
Ipsf: fuel cut reference output value (reference output value)
Ipr: value (concentration corresponding value) obtained by multiplying the actual output value of the implemented oxygen sensor by the correction coefficient Kp
Ipav: average output value
Ipavf: inter-fuel-cut average output value
R1: first range
R2: second range
R3: third range
t1: period after start of fuel cut

The invention claimed is:

1. An oxygen sensor control apparatus which obtains, when a fuel cut operation is performed so as to stop supply of fuel to an internal combustion engine, a correction coefficient used to calibrate the relation between oxygen concentration and an actual output value of an oxygen sensor attached to an exhaust pipe of the internal combustion engine and which detects the oxygen concentration of exhaust gas flowing through the exhaust pipe by making use of the actual output value and the correction coefficient, the apparatus being characterized by comprising:

average output value calculation means for excluding, from a plurality of actual output values of the oxygen sensor acquired during a single period of the fuel cut operation or a plurality of concentration corresponding values which represent oxygen concentrations calculated from the actual output values acquired during a single period of the fuel cut operation, those values which fall outside a predetermined first range, and for calculating an average output value by averaging the remaining values;

inter-fuel-cut average output value calculation means for calculating an inter-fuel-cut average output value by averaging a plurality of average output values calculated for a predetermined number of times of the fuel cut operation; and correction coefficient calculation means for obtaining a new correction coefficient for correcting the actual output value of the oxygen sensor, on the basis of the inter-fuel-cut average output value and a reference output value set in advance, wherein, when the inter-fuel-cut average output value deviates from a predetermined third range a predetermined number of times continuously, the correction coefficient calculation means obtains the correction coefficient by use of at least one of a plurality of the inter-fuel-cut average output values deviating from the third range.

2. An oxygen sensor control apparatus according to claim 1, wherein the first range is set to extend from the reference output value such that the reference output value is located at the center of the first range.

3. An oxygen sensor control apparatus according to claim 1, wherein the inter-fuel-cut average output value calculation means averages the plurality of average output values, excluding those which fall outside a predetermined second range which is contained in the first range and is narrower than the first range.

4. An oxygen sensor control apparatus according to claim 3, wherein the second range is set to extend from the reference output value such that the reference output value is located at the center of the second range.

5. An oxygen sensor control apparatus according to claim 1, wherein the average output value calculation means calculates the average output value from the plurality of actual output values of the oxygen sensor acquired at predetermined intervals or the plurality of concentration corresponding values which represent oxygen concentrations calculated from the actual output values acquired at predetermined, after elapse of a predetermined period of time after start of the fuel cut operation.

* * * * *